Patented Sept. 10, 1946

2,407,309

UNITED STATES PATENT OFFICE 2,407,309

CHEMOTHERAPEUTIC AGENTS OF THE SULPHONAMIDE TYPE

William A. Lott, Maplewood, Frank H. Bergeim, Highland Park, and Kathryn A. Losee, New Brunswick, N. J., assignors to E. R. Squibb & Sons, New York, N. Y., a corporation of New York No Drawing. Application February 4, 1942, Serial No. 429,578

5 Claims. (Cl. 260—397.7)

This invention relates to, and has for its object the provision of: (A) (Amino-benzene-sulphonamido)-aminophenol ethers; (B) salt-type derivatives thereof; (C) intermediates formed in the preparation of (A); and (D) methods of preparing (A), (B) and (C). Compounds (A) and (B) are valuable chemotherapeutic agents, being especially promising as antimalarials.

The invention comprises especially: (A) compounds of the general formula

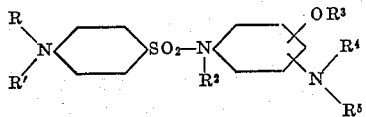

wherein R, R′, R², R⁴, and R⁵ represent each a member of the group consisting of hydrogen, hydrocarbon (preferably lower alkyl), substituted hydrocarbon (preferably dialkylaminoalkyl), and acyl (including sulphonyl) radicals, and R³ represents a member of the group consisting of hydrocarbon (preferably lower alkyl) and substituted hydrocarbon (preferably dialkylaminoalkyl) radicals; (B) salt-type derivatives of (A); (C) intermediates formed in the preparation of (A); and (D) methods of preparing (A), (B) and (C).

The method of preparing the compounds of this invenion essentially comprises condensing a compound of the group consisting of nitro-aminophenol ethers, alkylamino-amino-phenol ethers, and acylamino-amino-phenol ethers with a member of the group consisting of nitro-benzene-sulphonyl halides, alkylamino-benzene-sulphonyl halides, and acylamino-benzene sulphonyl halides. When the compounds are prepared from the nitro-amino-phenol ethers and/or the nitrobenzene-sulphonyl halide reactants, there are produced intermediate nitro compounds of the general formula

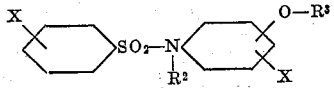

wherein R² and R³ have the above-given meaning, and one of the X's represents a nitro radical and the other represents a member of the group consisting of nitro, alkylamino, and acylamino radicals; and these nitro intermediates are converted to the corresponding amino compounds by reduction or catalytic-hydrogenation. When the compounds are prepared from the acylamino-aminophenol ether and/or acylamino-benzene-sulphonyl halide reactants, acylamino compounds are obtained, which may be converted into the corresponding amino compounds by hydrolysis.

The (amino-benzene-sulphonamido) - aminophenol ethers are generally amphoteric compounds, forming acid-addition salts with hydrochloric, sulphuric, boric, nitric, lactici, tartaric, and other acids commonly used to solubilize amine bases, as well as salts with bases, for example the alkali-metal bases and organic-amine bases. Some of the salts, it should be noted, are insoluble or only slightly soluble in water.

Compounds (B) also comprise salt-type derivatives in which R and/or R⁴ represent salified groups such as the following:

(I)—CO—(CH₂)ₙ—COO—(alkali metal( wherein n is an integer from 2 to 5

(II)  (lower alkyl)
 —CH
  SO₃—(alkali metal)

(III)—alkylene—SO₂—(alkali metal)

Thus, compounds embodying group (I) may be obtained by reacting the (amino-benzene-sulphonamido)-aminophenol ether with the appropriate aliphatic dicarboxylic acid anhydride (especially succinic anhydride), and converting the resulting acid (e. g., succinamic acid) into the corresponding alkali - metal — including ammonium—salt; compounds embodying group (II) may be obtained by adding the (amino-benzene-sulphonamido)-aminophenol ether to a solution of sodium bisulphite and a lower aliphatic aldehyde, heating the mixture until a clear solution is obtained, isolating the crude product by evaporating the solution to dryness, and purifying the crude product, e. g., by recrystallization from diluted 95% alcohol; and compounds embodying group (III) may be obtained by reacting the (amino-benzene - sulphonamido) - aminophenol ether with an alkali-metal aldehyde-sulphoxylate (e. g., sodium formaldehyde sulfoxylate) in a suitable solvent (e. g., glacial acetic acid). If the (amino-benzene - sulphonamido) - aminophenol ether has both amino groups available, compounds in which both R and R⁴ represent such salified groups are obtained. To obtain a compound in which R alone represents such a group, an (amino-benzene - sulphonamido) - nitrophenol ether is used as the reactant, and the resulting nitro salt-type derivative is then catalytically-hydrogenated to the corresponding amino salt-type derivative; and to obtain a compound in which R⁴ alone represents such a group, a (nitro-benzenesulphonamido)-aminophenol ether is used as the reactant, and the resulting nitro salt-type derivative is then catalytically-hydrogenated to the corresponding amino salt-type derivative.

The following examples are illustrative of the invention:

EXAMPLE 1

(a) Preparation of 2-(p-Acetamino-Benzene-Sulphonamido)-5-Nitro-Anisole 56 g. 5-nitro-2-amino-anisole and 78 g. p-acetamino-benzene-sulphonyl chloride are ground together in a mortar, and 40 cc. pyridine is added, forming a dark-brown solution which soon becomes very viscous. The solution is heated for an hour on a steam bath, and several volumes of cold water is then added thereto with stirring. The gummy precipitate formed, which later becomes granular, is filtered off and washed with water. The product, crude 2-(p-acetamino-benzene-sulphonamido)-5-nitro-anisole, melting at 202–208° C. (Fisher melting-point block), may be used without further purification.

(b) Preparation of 2-(p-Amino-Benzene-Sulphonamido-5-Nitro-Anisole 50 g. crude 2-(p-acetamino-benzene-sulphonamido)-5-nitroanisole is added to a mixture of 500 cc. alcohol and 500 cc. 10% hydrochloric acid, and the mixture is refluxed until a clear solution is formed and for one hour thereafter. On removal of the alcohol (by distillation) and cooling, a crystalline precipitate forms, and is filtered off and washed several times with alcohol. The product, 2-(p-amino-benzene-sulphonamido)-5-nitro-anisole, melts at 173–4° C.

(c) Preparation of 2-(p-Amino-Benzene-Sulphonamido)-5-Amino-Anisole

Procedure I 20 g. 2-(p-amino-benzene-sulphonamido)-5-nitro-anisole is suspended in 225 cc. aqueous acetic acid, and treated with hydrogen under atmospheric pressure in the presence of Adams' platinum catalyst, until approximately 4,630 cc. hydrogen has been absorbed. The catalyst is removed from the reaction mixture by filtration; and the filtrate is concentrated under reduced pressure to give a solid, which is dissolved in dilute aqueous hydrochloric acid. The solution is treated with decolorizing carbon and filtered, and the free base is precipitated by adding dilute sodium hydroxide; and the product is further purified by dissolving it in excess dilute sodium hydroxide, filtering, and adding dilute hydrochloric acid until no further precipitation occurs. On recrystallization from aqueous alcohol, the product, 2-(p-amino-benzene-sulphonamido)-5-amino-anisole, melts at 181–2° C.

Procedure II 20 g. 2-(p-amino-benzene-sulphonamido)-5-nitro-anisole and 20 g. powdered iron are mixed in a mortar; and 80 cc. acetic acid is then heated to about 70° C., and the mixture is added thereto in small portions so that a mild ebullition continues throughout the reaction. Sufficient water is added to hydrolyze the acetate and precipitate the amine base, and the liquid is removed from the solid by centrifugation. The solid, containing the product and excess iron, is extracted twice with 10% sodium hydroxide; and the centrifuged supernatant is filtered and made just alkaline to Congo red. The precipitate is filtered, and recrystallized from 50% alcohol; the thus-obtained 2-(p-amino-benzene-sulphonamido)-5-amino-anisole melts at 186–8° C. (uncorrected).

(d) Preparation of 2-(p-Amino-Benzene-Sulphonamido)-5-Amino-Anisole Hydrochloride The 2-(p-amino-benzene-sulphonamido)-5-amino-anisole is dissolved in absolute alcohol, an equivalent quantity of dry hydrochloric acid is added thereto, and the salt is precipitated by adding ether (or by evaporating the alcoholic solution to dryness). An aqueous solution of the hydrochloride may be prepared without isolating the salt by adding the 2-(p-amino-benzene-sulphonamido)-5-amino-anisole to the requisite quantity of a dilute aqueous solution of hydrochloric acid.

(e) Preparation of the Sodium Salt of 2-(p-Amino-Benzene-Sulphonamido-5-Amino-Anisole The 2-(p-amino-benzene-sulphonamido)-5-amino-anisole is suspended in boiling alcohol, and a moderate excess (over the equivalent quantity) of alcoholic sodium hydroxide is added. The solution is then evaporated to dryness in vacuo to give the sodium salt of 2-(p-amino-benzene-sulphonamido)-5-amino-anisole. An aqueous solution of the sodium salt may be prepared without isolating the salt by adding the 2-(p-amino-benzene-sulphonamido)-5-amino-anisole to the requisite quantity of a dilute aqueous solution of sodium hydroxide.

(f) Preparation of the di-(Sodium Formaldehyde Sulphoxylate) Derivative of 2-(p-Amino-Benzene-Sulphonamido)-5-Amino-Anisole A mixture of 8.8 g. 2-(p-amino-benzene-sulphonamido)-5-amino-anisole and 11 g. sodium formaldehyde sulphoxylate is added with stirring to 15 cc. glacial acetic acid. When a clear solution is obtained, ether is added until a solid precipitate forms. The precipitate is filtered off, washed with ether, and dissolved in a small amount of water, and the solution is neutralized with sodium bicarbonate on addition of alcohol and cooling, the inorganic salts precipitate out and are removed by filtration. Ether is then added to the filtrate, and the crystalline precipitate formed is filtered off, washed, dried, and purified by recrystallizing from 50% alcohol. The product is a derivative of 2-(p-amino-benzene-sulphonamido)-5-amino-anisole in which both R and $R^4$ are methane sodium sulphinate groups.

(g) Preparation of the Mono-(Sodium Formaldehyde Sulphoxylate) Derivative of 2-(p-Amino-Benzene-Sulphonamido)-5-Amino-Anisole A mixture of 9.7 g. 2-(p-amino-benzene-sulphonamido)-5-nitro-anisole and 5.5 g. of sodium formaldehyde sulphoxylate is added with stirring to 15 cc. glacial acetic acid. When a clear solution is obtained, ether is added until a solid precipitate forms. The precipitate is filtered off, washed with ether, and dissolved in a small amount of water, and the solution is neutralized with sodium bicarbonate; on addition of alcohol and cooling, the inorganic salts precipitate out and are removed by filtration. Ether is then added to the filtrate, and the crystalline precipitate formed is filtered off, washed, dried, and purified by recrystallizing from 50% alcohol. This nitro compound is then dissolved in alcohol and hydrogenated, using Adams' platinum oxide catalyst. The product is a derivative of 2-(p-amino-benzene-sulphonamido)-5-amino-anisole in which R is a methane sodium sulphinate group.

EXAMPLE 2

(a) PREPARATION OF 2 - (P-ACETAMINO-BENZENE-SULPHONAMIDO)-4-NITRO-ANISOLE 56 g. 4-nitro-2-amino-anisole and 78 g. p-acetamino - benzene - sulphonyl chloride are ground together in a mortar, and 40 cc. pyridine is added; and the dark-brown solution formed, which soon becomes very viscous, is heated on a steam bath for an hour, and several volumes of cold water is added with stirring. The gummy precipitate formed, which later becomes granular, is filtered off and washed with hot water; the product, crude 2 - (p-acetamino-benzene-sulphonamido)-4-nitro-anisole, melting at 254-8° C. (Fisher melting-point block), may be used without further purification.

(b) PREPARATION OF 2-(P-AMINO-BENZENE-SULPHONAMIDO)-4-NITRO-ANISOLE 70 g. of the crude 2-(p-acetamino-benzene-sulphonamido)-4-nitro-anisole is added to a mixture of 700 cc. alcohol and 700 cc. 10% hydrochloric acid, and the mixture is refluxed until a clear solution is formed and for one hour thereafter. On removal of the alcohol (by distillation) and cooling, the hydrochloride of 2-(p-amino-benzene-sulfonamido)-4-nitro-anisole separates, and is filtered off. The free base, obtained by suspending the hydrochloride in water and adding an equivalent quantity of dilute sodium hydroxide solution, melts at 188–190° C.

(c) PREPARATION OF 2-(P-AMINO-BENZENE-SULPHONAMIDO)-4-AMINO-ANISOLE 10 g. 2-(p-amino-benzene-sulphonamido)-4-nitro-anisole and 10 g. powdered iron are thoroughly mixed in a mortar; 40 cc. acetic acid is then heated to about 70° C., and while agitating the acetic acid in a flask, the mixture is added thereto in small portions at such rate that a mild ebullition continues throughout the reaction. The reaction mixture is then cooled, sufficient water is added to hydrolyze the acetate and precipitate the amine base, and the liquid is removed from the solid portion by centrifugation. 300 cc. 10% sodium-hydroxide solution is added to the solid, and the mixture stirred thoroughly and centrifuged; and the solid is again extracted with 10% sodium hydroxide solution and centrifuged. On filtering the supernatant and making it just alkaline to Congo red, the product, 2-(p-amino-benzene-sulphonamido)-4-amino anisole, precipitates as a light tan powder. After recrystallization from 50% alcohol, it melts at 231–3° C. (uncorrected).

(d) PREPARATION OF THE DI-(ACETALDEHYDE-SODIUM BISULPHITE) DERIVATIVE OF 2-(P-AMINO-BENZENE-SULPHONAMIDO)-4-AMINO-ANISOLE

To a saturated solution of 3.5 g. sodium bisulphite in 6 cc. cold water is added 1.8 cc. acetaldehyde, and the mixture is stirred for about one hour. Then 5 g. 2-(p-amino-benzene-sulphonamido)-4-amino-anisole is added to this solution, and the mixture is heated on the steam bath for about one hour, at the end of which time there is a clear solution. The solution is evaporated to dryness, and the product is recrystallized from 95% alcohol. The product is a derivative of 2-(p-amino-benzene-sulphonamido) - 4 - amino-anisole in which both R and R⁴ are α-ethane sodium sulfonate groups.

(e) PREPARATION OF THE MONO-(ACETALDEHYDE-SODIUM BISULPHITE) DERIVATIVE OF 2-(P-AMINO-BENZENE-SULPHONAMIDO)-4-AMINO-ANISOLE

To a saturated solution of 16.9 g. sodium bisulphite in 25 cc. water is added 7.1 g. acetaldehyde, and the mixture is stirred for about one hour. Then 50 g. of well-ground 2-(p-amino-benzene-sulphonamido)-4-nitro-anisole are added to this solution, and the mixture is heated on the steam bath for about one hour. The clear solution is then concentrated to dryness, and the product purified by recrystallization from 95% alcohol. This nitro compound is then dissolved in alcohol, and hydrogenated, using Adams' platinum oxide catalyst. The product is a derivative of 2-(p-amino-benzene-sulphonamido) - 4-amino-anisole in which R is an α-ethane sodium sulphonate group.

The 2 -(p - amino-benzene-sulphonamido)-4-amino-anisole may be converted into various other salt-type derivatives thereof, by the procedures detailed in (d), (e), (f), and (g) of Example 1.

EXAMPLE 3

(a) PREPARATION OF 3-NITRO - 4 - (P-ACETAMINO-BENZENE-SULPHONAMIDO)-ANISOLE

Procedure I 168 g. 3-nitro-4-amino-anisole is intimately mixed with 233.5 g. p-acetamino-benzene-sulphonyl chloride, and the mixture is treated with 120 cc. pyridine. On addition of water to the resulting dark solution, 3-nitro-4-(p-acetamino-benzene-sulphonamido)-anisole is precipitated as a granular material. The product is purified by dissolving it in dilute aqueous alkali, reprecipitating it by acidifying the solution, and recrystallizing from 50% alcohol, and then melts at 173-4° C. (uncorrected).

Procedure II 168 g. 3-nitro-4-amino-anisole is dissolved in 336 cc. pyridine, using a little heat if necessary. Solid p-acetamino-benzene-sulphonyl chloride is then stirred into this solution gradually, not allowing the temperature to rise above 50° C. After standing a few hours at room temperature, the solution is diluted with water, and made acid to Congo red with hydrochloric acid. The product precipitates as a yellow-orange crystalline product, and on recrystallizing from alcohol, melts at 173-4° C.

(b) PREPARATION OF 3-NITRO-4-(P-AMINO-BENZENE-SULPHONAMIDO)-ANISOLE 175 g. 3-nitro-4-(p-acetamino-benzene-sulphonamido)-anisole is digested for an hour with 3500 cc. of a 1:1 mixture of 10% aqueous hydrochloric acid and alcohol, the compound gradually going into solution; and the solution is then cooled, and adjusted to a pH of about 5–6 by the addition of 40% sodium hydroxide solution. The thus-precipitated yellow granular substance, 3-nitro - 4 -(p - amino - benzene-sulphonamido)-anisole, after purification by recrystallization from alcohol, melts at 118–9° C.

(c) PREPARATION OF 3-AMINO-4-(P-AMINO-BENZENE-SULPHONAMIDO)-ANISOLE

Procedure I 30 g. 3-nitro-4-(p-amino-benzene-sulphonamido)-anisole is added gradually to a hot suspension of 93 g. iron powder in a solution of 31 cc. concentrated hydrochloric acid in 276 cc. 95% alcohol. After addition of all of the nitro compound, the mixture is refluxed for about 15 hours, while stirring, and the iron powder is then filtered off and thoroughly extracted with hot 95% alcohol. The filtrate and alcoholic extract are combined, acidified to Congo red with alcoholic hydrochloric acid, and evaporated to dryness under subatmospheric pressure. The residue, crude 3-amino-4-(p-amino-benzene-sulphonamido)-anisole hydrochloride, is dissolved in water, and the solution is treated with decolorizing carbon and filtered; and the free base is precipitated from the filtrate by adding dilute sodium hydroxide. The precipitate, a pinkish crystalline material, is recrystallized from n-butanol to give the 3-amino-4-(p-amino-benzene-sulphonamido)-anisole as an almost pure, white crystalline material melting at 192–3° C.

*Procedure II*

10 g. 3-nitro-4-(p-amino-benzene-sulphonamido)-anisole and 10 g. powdered iron are mixed in a mortar; 20 cc. acetic acid is then heated to 70° C., and the mixture added thereto in small amounts just fast enough to cause mild ebullition throughout the reaction. Sufficient water is then added to the cooled reaction mixture to hydrolyze the acetate and precipitate the amine base, and the liquid is removed by centrifuging. The solid portion is extracted twice with 10% sodium hydroxide, centrifuged and the supernatant liquid filtered; and the filtrate is made just acid to Congo red. The precipitate, 3-amino-4-(p-amino-benzene-sulphonamido)-anisole, after recrystallization from 50% alcohol, melts at 194–5° C. (uncorrected).

*Procedure III*

5 g. 3-nitro-4-(p-acetamino-benzene-sulphonamido)-anisole (cf. Example 3(a)) and 5 g. powdered iron are mixed in a mortar; 10 cc. acetic acid is then heated to about 70° C., and the mixture is added thereto in small portions just fast enough to cause a mild ebullition throughout the reaction. The mixture is cooled, and sufficient water is added to hydrolyze the acetate and precipitate the amine base, and the liquid is removed by centrifuging. The solid portion is extracted twice with 10% sodium hydroxide, and the extract is centrifuged and the supernatant filtered and made just alkaline to Congo red. The product, 3-amino-4-(p-acetamino-benzene-sulphonamido)-anisole, after recrystallization from alcohol, melts at 171–3° C. (uncorrected).

The 3-amino-4-(p-acetamino-benzene-sulphonamido)-anisole is then converted into 3-amino-4-(p-amino-benzene-sulphonamido)-anisole by hydrolysis with 10% aqueous hydrochloric acid as detailed in Example 3 (b).

The 3-amino-4-(p-amino-benzene-sulphonamido)-anisole may be converted into various salt-type derivatives by the procedures detailed in (e), (f) and (g) of Example 1 and in (d) and (e) of Example 2.

EXAMPLE 4

(a) PREPARATION OF 3-(P-ACETAMINO-BENZENE-SULPHONAMIDO)-4-ACETAMINO-ANISOLE 30 g. 3-nitro-4-acetamino-anisole is suspended in 600 cc. alcohol and hydrogenated, using Adams' platinum oxide catalyst. The catalyst is filtered off, and the filtrate concentrated in vacuum at 40° C.; after crystallization from absolute alcohol, the product, 3-amino-4-acetamino-anisole, melts at 147–148.5° C.

13 g. p-acetamino-benzene-sulphonyl chloride is added slowly, with cooling, to 13 cc. pyridine, and the solution is added slowly, with cooling to a suspension of 10 g. 3-amino-4-acetamino-anisole in 15 cc. pyridine. The deep red liquid formed is allowed to stand for an hour; and cold water is added thereto; and the red granular precipitate formed is filtered off, washed with water, and recrystallized from 50% alcohol. The product, 3-(p-acetamino-benzene-sulphonamido)-4-acetamino-anisole, melts at 230–1° C. (uncorrected).

(b) PREPARATION OF 3-(AMINO-BENZENE-SULPHONAMIDO)-4-AMINO-ANISOLE 20 g. 3-(p-acetamino-benzene-sulphonamido)-4-acetamino-anisole, 200 cc. 10% hydrochloric acid, and 20 cc. alcohol (to prevent foaming) are boiled for an hour; and the clear solution formed is filtered, cooled, and made just alkaline to Congo red by the addition of 10% sodium hydroxide, a light-colored precipitate being formed. The precipitate, 3-(p-amino-benzene-sulphonamido)-4-amino-anisole, is filtered off, and after recrystallization from 50% alcohol, melts at 178–9° C. (uncorrected).

EXAMPLE 5

(a) PREPARATION OF 3-(P-NITRO-BENZENE-SULPHONAMIDO)-4-ACETAMINO-ANISOLE 15.2 g. p-nitro-benzene-sulphonyl chloride is slowly added to 15 cc. pyridine, while cooling, and the solution is slowly added to a suspension of 15 g. 3-amino-4-acetamino-anisole in 20 cc. pyridine, while cooling. The deep-orange reaction mixture is allowed to stand for an hour, and cold water is added thereto; a granular orange precipitate being formed. The precipitate, 3-(p-nitro-benzene-sulphonamido)-4-acetamino-anisole, is filtered off and washed with water; and after recrystallization from alcohol, it melts at 183–5° C. (uncorrected).

(b) PREPARATION OF 3-(P-AMINO-BENZENE-SULPHONAMIDO)-4-ACETAMINO-ANISOLE 12.5 g. 3-(p-nitro-benzene-sulphonamido)-4-acetamino-anisole in 250 cc. alcohol is hydrogenated in the presence of Adams' platinum oxide catalyst. The catalyst is filtered off and the filtrate concentrated in vacuo; the residue, 3-(p-amino-benzene-sulphonamido)-4-acetamino-anisole, after recrystallization from alcohol, melts at 155–7° C. (uncorrected).

EXAMPLE 6

PREPARATION OF 2-AMINO-4-(P-AMINO-BENZENE-SULPHONAMIDO)-ANISOLE 2-acetamino-4-nitro-anisole is hydrogenated in alcohol in the presence of Adams' platinum oxide catalyst. The catalyst is filtered off, and the filtrate concentrated in vacuo. The product, 2-acetamino-4-amino-anisole, after recrystallization from alcohol, melts at 107–8° C. (uncorrected).

The 2-acetamino-4-amino-anisole is condensed with p-acetamino-benzene-sulphonyl chloride—e. g. in the manner described in Example 4 (a)—and the resulting 2-acetamino-4-(p-acetamino-benzene-sulphonamido)-anisole (M. P. 242–4° C.) is hydrolyzed—e. g. in the manner described in Example 4(b)—to obtain 2 - amino - 4 - (p - amino - benzene - sulphonamido)-anisole (M. P. 172–3° C.).

EXAMPLE 7

Preparation of 2-Acetamino-4-(p-Amino-Benzene-Sulphonamido)-Anisole 2-acetamino-4-amino-anisole is condensed with p-nitro-benzene-sulphonyl chloride—e. g. in the manner described in Example 5(a), and the resulting 2-acetamino-4-(p-nitro-benzene-sulphonamido)-anisole (M. P. 214–5° C.) is reduced—e. g. in the manner described in Example 5(b)—to obtain 2-acetamino-4-(p-amino-benzene-sulphonamido)-anisole.

EXAMPLE 8

(a) Preparation of 3-Nitro - 4 - (p-Acetamino-Benzene-Sulphonamido)-Phenetole 100 g. 3-nitro-4-amino-phenetole and 128.4 g. p-acetamino - benzene - sulphonyl chloride are mixed in a mortar, and 66 cc. pyridine is added thereto. A dark-red liquid is formed, with evolution of heat. The reaction mixture is heated on the steam bath for a half hour, and cold water is added thereto; and the granular orange product formed, 3-nitro-4-(p-acetamino-benzene-sulphonamido)-phenetole, is filtered off and washed with water. On recrystallization from alcohol, it melts at 154–5° C. (uncorrected).

(b) Preparation of 3-Nitro - 4 - (p-Amino-Benzene-Sulphonamido)-Phenetole 293 g. 3 - nitro-4-(p-acetamino-benzene-sulphonamido)-phenetole, 2.930 liters 10% hydrochloric acid, and 25 cc. alcohol (to prevent foaming) are boiled together for 1¾ hours. The clear solution formed is filtered, and then cooled. Some of the product precipitates out (as the hydrochloride) on cooling, and is converted to the free base by suspending in water and adding sodium hydroxide until just alkaline to Congo red. The filtrate (obtained on removal of the hydrochloride) also is made just alkaline to Congo red, precipitating the 3-nitro-4-(p-amino-benzene-sulphonamido)-phenetole as an orange powder, which is then recrystallized from alcohol (M. P. 114–6° C.).

(c) Preparation of 3-Amino-4-(p-Amino-Benzene-Sulphonamido)-Phenetole 10 g. 3-nitro-4-(p-amino-benzene-sulphonamido)-phenetole and 10 g. powdered iron are mixed in a mortar; then 40 cc. acetic acid is heated to about 70° C., and the mixture added thereto in small portions just fast enough to cause mild ebullition throughout the reaction. Sufficient water is then added to hydrolyze the acetate and precipitate the amine base, and the liquid portion centrifuged off. The solid portion is extracted twice with 10% sodium hydroxide solution, and the supernatant obtained by centrifuging is filtered and made just alkaline to Congo red. The precipitate, 3-amino-4-(p-amino-benzene-sulphonamido)-phenetole, is recrystallized from 50% alcohol (M. P. 241–2° C.).

EXAMPLE 9

Preparation of 3-(Ethyl-Sulphonamido)-4-(p-Amino-Benzene-Sulphonamido)-Anisole 33.5 g. of 3-amino-4(p-acetamino-benzene-sulphonamido)-anisole (cf. Example 3(e) Procedure III) is mixed with 16 g. pyridine, and then gradually treated with 13 g. ethyl-sulphonyl chloride. After standing for an hour, the mixture is diluted with 300 cc. ice water, and the gummy precipitate which first forms and soon becomes granular is filtered off and washed with water. The product, 3-(ethyl-sulphonamido)-4(p-acetamino-benzene-sulphonamido) - anisole, is then digested for one hour with 300 cc. 10% aqueous hydrochloric acid, whereupon it gradually enters solution therein. After cooling and filtering off a small amount of undissolved material, the solution is neutralized to about pH 6 by the addition of 10% aqueous sodium hydroxide. The resulting granular precipitate, 3-(ethyl-sulphonamido)-4-(p - amino - benzene - sulphonamido)-anisole, is obtained as a white crystalline material by recrystallization from 50% alcohol.

EXAMPLE 10

Preparation of 3-(p-Amino-Benzene-Sulphonamido)-4-Dimethylamino-Anisole 3-nitro-4-dimethylamino-anisole is hydrogenated in alcohol in the presence of Adams' platinum oxide catalyst to obtain 3-amino-4-dimethylamino-anisole.

18 g. 3-amino-4 - dimethylamino - anisole is mixed with 24 g. p-acetamino-benzene-sulphonyl chloride, and then treated with 12 g. pyridine. A thick solution forms, which soon becomes warm and viscous. After an hour, this solution is treated with 250 cc. water; and the gummy precipitate of 3-(p-acetamino-benzene-sulphonamido)-4-dimethylamino-anisole formed is rubbed up with water until it granulates. After thoroughly washing with water, 25 g. of the acetylated compound is hydrolyzed by digesting with 250 cc. 10% hydrochloric acid for an hour. After cooling and filtering off any undissolved material, the solution is neutralized to a pH of about 6 by means of aqueous sodium hydroxide solution; the product, 3-(p-amino - benzene - sulphonamido)-4-dimethylamino-anisole separates as a granular solid, and is obtained practically white and crystalline by recrystallization from 50% alcohol.

EXAMPLE 11

(a) Preparation of 3-Nitro-N-(p-Tolyl-Sulphonyl) - N - (β - Diethylamino - Ethyl) - 4-Amino-Anisole 30 g. 3-nitro-4-(p-tolyl-sulphonamido)-anisole is dissolved in 113 cc. absolute alcohol by heating to boiling, and 15.5 g. β-diethylamino-ethyl chloride hydrochloride is added thereto, followed by 27.5 g. anhydrous potassium carbonate. The mixture is then refluxed for several hours and filtered hot; and the filtrate is concentrated to a syrup under reduced pressure. The syrup is taken up in benzene, washed several times with dilute sodium hydroxide, then with water, and dried; and on distilling off the benzene, the 3-nitro-N-(p-tolyl-sulphonyl)-N-(β-diethylamino - ethyl)-4-amino-anisole is left as an amber syrup.

(b) Preparation of 3-Nitro-4-(β-Diethylamino-Ethylamino)-Anisole 10 g. 3 - nitro-N-(p-tolyl-sulphonyl)-N-(β-diethylamino-ethyl)-4-amino-anisole is mixed with 25 cc. 90% sulphuric acid, and the resultant solution is allowed to stand about 24 hours at room temperature. The solution is then mixed with chopped ice, and strongly alkalinized; and the liberated base is taken up in benzene, and the solution is dried and distilled under reduced pressure. The product, 3-nitro-4-(β-diethylamino-ethylamino)-anisole, is obtained as a red oil boiling at about 200–212° C./1.5 mm., and solidifying to crystals melting at about 36–9° C.

This base may be converted to its mono-hydrochloride by dissolving in ether and treating with the requisite quantity of an ethereal solution of hydrogen chloride. On purification by dissolving in alcohol and precipitating with ether, it melts at 159–160° C.

(c) PREPARATION OF 3-AMINO-4-(β-DIETHYL-AMINO-ETHYLAMINO)-ANISOLE 5. g. 3-nitro-4-(β-diethylamino-ethyl) anisole hydrochloride is dissolved in 200 cc. of 95% alcohol, and hydrogenated under slightly greater than atmospheric pressure using Adams' platinum oxide catalyst. When three equivalents of hydrogen have been taken up, the catalyst is filtered off, and the filtrate evaporated to remove the aqueous alcohol. The residue is filtered off, and the filtrate evaporated to remove the aqueous alcohol, and converted to the di-hydrochloride of 3-amino-4-(β-diethylamino-ethyl)-anisole by adding ethereal hydrochloric acid. After recrystallization from absolute alcohol, the salt partially melts at 160–162° C., then resolidifies and decomposes at 175° C.

(d) PREPARATION OF 3-(P-AMINO-BENZENE-SULPHONAMIDO) - 4 - (β-DIETHYLAMINO-ETHYLAMINO)-ANISOLE 31 g. 3-amino-4-(β-diethylamino-ethylamino)-anisole is mixed with 23 g. p-acetamino-benzene-sulphonyl chloride, and the mixture is treated with 16 g. pyridine, whereupon the mixture becomes hot and forms a thick solution. After an hour, about 300 cc. of water is added, and an acetyl derivative, 3-(p-acetamino-benzene-sulphonamido)-4-(β-diethylamino-ethylamino)-anisole, separates as a pasty solid. After thoroughly washing with water, this product is hydrolyzed by digesting for about an hour with 200 cc. 10% aqueous hydrochloric acid to which about 100 cc. alcohol has been added. The clear solution which forms is boiled, lastly with decolorizing carbon filtered, and neutralized with aqueous sodium hydroxide to about pH 6, whereupon the product, 3-(p-amino-benzene-sulphonamido)-4-(β-diethylamino-ethylamino)-anisole, separates as a granular solid; and on recrystallization from 50% alcohol, the product is obtained as a buff-colored crystalline solid.

EXAMPLE 12

PREPARATION OF 3-(P-AMINO-BENZENE-SULPHON-AMIDO)-4-CARBAMIDO-ANISOLE 3-nitro-4-amino anisole is dissolved in glacial acetic acid and an equivalent quantity of finely-divided potassium cyanate is gradually added thereto. After standing two days, the solid product, 3-nitro-4-carbamido-anisole, is collected on a filter pad, washed with water, and catalytically-hydrogenated in glacial acetic acid in the presence of Adams' catalyst. When the theoretical volume of hydrogen has been taken up, the glacial acetic acid is removed in vacuo, the residue alkalinized with strong aqueous sodium hydroxide, and the product taken up in ether. After evaporation of the ether, the product, 3-amino-4-carbamido-anisole is obtained as a dark-colored semi-solid. Without purification, it is taken up in pyridine and treated with the equivalent quantity of p-acetamino-benzene-sulphonyl chloride. After a clear, dark-colored solution is formed, it is allowed to stand several hours, and then diluted with water. The product, 3-(p-acetamino-benzene-sulphonamido)-4-carbamido - anisole, separates as a gummy precipitate. It is dissolved in dilute aqueous alkali, treated with decolorizing carbon, and reprecipitated by adding an excess of dilute hydrochloric acid. The now granular precipitate, the acetyl derivative, is filtered off and washed. It is then hydrolyzed by digesting for about an hour with aqueous hydrochloric acid and enough alcohol to prevent frothing. The product is then isolated as a granular solid by neutralizing to about pH 6 with aqueous sodium hydroxide.

EXAMPLE 13

PREPARATION OF 3-PHENYLCARBAMIDO-4-(P-AMINO-BENZENE-SULPHONAMIDO)-ANISOLE

10% aqueous solution of the sodium salt of 3-amino-4-(p-acetamino-benzene - sulphonamido)-anisole is mixed with an equivalent amount of phenyl isocyanate, and shaken in the shaking machine until the odor of phenyl isocyanate has disappeared. The solution is filtered to remove any diphenyl urea which has formed, and is then acidified; and the acetyl derivative, 3-phenylcarbamido-4-(p-acetamino-benzene-sulphonamido)-anisole, separates as a granular powder. This powder is then digested for about an hour with a 50% mixture of 10% aqueous hydrochloric acid and alcohol. When all the acetyl derivative has been hydrolyzed, a clear solution results, which is then cooled and neutralized to about pH 6 by the addition of aqueous sodium hydroxide, whereupon the product, 3 - phenylcarbamido - 4 - (p-amino-benzene-sulphonamido) - anisole, separates as a granular powder.

Compounds embodying a substituted phenylcarbamido radical may be obtained in the same manner, using the correspondingly-substituted phenyl isocyanate reactant.

EXAMPLE 14

(a) PREPARATION OF 2,4 DI-(P-ACETAMINO-BENZENE-SULPHONAMIDO)-ANISOLE 25 g. 2,4-diamino-anisole dihydrochloride and 27.5 g. p - acetamino-benzene sulphonylchloride are mixed in a mortar, and 40 cc. pyridine is added thereto. A deep red liquid forms and there is a slight rise in temperature. The reaction mixture is heated on the steam bath for one-half hour, and 25 cc. 50% sodium hydroxide is added thereto. The oily gob which settles to the bottom of the mortar is washed several times with 10% hydrochloric acid, decanting after each washing. After standing for about one hour, the oil becomes granular, and is filtered. On recrystallization from alcohol, the product, 2,4 - di-(p-acetamino-benzene-sulphonamido)-anisole, melts at 237–8° C. (Fisher melting-point block); 241–2° C. (uncorrected).

(b) PREPARATION OF 2,4 DI-(P-AMINO-BENZENE-SULPHONAMIDO)-ANISOLE 10 g. 2,4 - di-(p-acetamino-benzene-sulphonamido)-anisole is hydrolyzed with about 125 cc. 10% hydrochloric acid, a small amount of alcohol being added to prevent forming. A clear solution forms after heating about 40 minutes. The solution is cooled, and made just alkaline to Congo red; and the precipitate, 2,4-di(p-amino-benzene-sulphonamido)-anisole, is filtered, and recrystallized from alcohol.

EXAMPLE 15

(a) Preparation of 2,5 di-(p-Acetamino-Benzene-Sulphonamido)-Anisole 25 g. 2,5 diamino-anisole dihydrochloride is suspended in 250 cc. ethyl acetate and 100 cc. 10% sodium hydroxide is added thereto. The base is extracted with ether, and added to 27.5 g. p-acetamino-benzene-sulphonylchloride suspended in 100 cc. ethyl acetate. The reaction mixture is allowed to stand in the ice box for about three days, and the crystals formed are filtered off and dissolved in 10% sodium hydroxide; and the solution is treated with activated charcoal and filtered. The filtrate is then made neutral with 10% hydrochloric acid. The pinkish precipitate formed, 2,5-di(p-acetamino-benzene-sulphonamido)-anisole, is filtered off and recrystallized from alcohol; it melts at 176–9° C. (uncorrected).

(b) Preparation of 2,5 di-(p-Amino-Benzene-Sulphonamido)-Anisole 20 g. 2,5 - di(p-acetamino-benzene-sulphonamido)-anisole is boiled for one hour with 200 cc. 10% hydrochloric acid. The clear solution formed is cooled, and made neutral to Congo red with sodium hydroxide. The precipitate, 2,5 - di(p-amino-benzene-sulphonamido)-anisole is filtered off and recrystallized from alcohol.

EXAMPLE 16

Preparation of 3,4-di(p-Amino-Benzene-Sulphonamido)-Anisole 3-nitro-4-amino-anisole is condensed with p-acetamino-benzene-sulphonyl chloride—e. g. in the manner described in Example 1 (a)—the resulting 3 - nitro-4-(p-acetamino-benzene-sulphonamido)-anisole is then reduced to 3-amino-4 - (p-acetamino-benzene-sulphonamido)- anisole—e. g. in the manner described in Example 1 (c)—the latter is condensed with p-acetamino-benzene-sulphonyl chloride to obtain 3,4-di(p-acetamino-benzene-sulphonamido)-anisole, and the diacetyl compound is hydrolyzed—e. g. in the manner described in Example 1 (b)—to obtain 3,4 - di(p - amino-benzene-sulphonamido)-anisole.

EXAMPLE 17

(a) Preparation of 3-(p-Acetamino-Benzene-Sulphonamido)-4-Benzylamino-Anisole 25 g. 3-nitro-4-amino-anisole is dissolved by warming in a mixture of 50 cc. of benzyl alcohol and 10 cc. of benzyl chloride. The solution is heated under a reflux condenser for 12 hours at about 100° C.; on cooling, crude 3-nitro-4-benzylamino-anisole separates out in the form of red needles. It is purified by recrystallizing from aqueous alcohol, from which it separates as bright red needles melting at 105° C.

19.5 g. 3-nitro-4-benzylamino-anisole is dissolved in 225 cc. of absolute alcohol, and hydrogenated in the presence of Adams' platinum oxide catalyst. The solution changes from red to colorless or pale yellow. The catalyst is then filtered off, and the alcoholic filtrate is concentrated under reduced pressure to give crude 3-amino-4-benzylamino-anisole as a red syrup.

17 3-amino-4-benzylamino-anisole is dissolved in 20 cc. pyridine, and 17.6 p-acetamino-benzene-sulphonyl chloride is added thereto in small portions. The syrupy liquid is allowed to stand for about 24 hours at room temperature, after which it is diluted with water and acidified to Congo red. The product, 3 - (p-acetamino-benzene-sulphonamido)-4-benzylamino anisole separates out as a light-brown crystalline material, and is purified by crystallizing from aqueous alcohol.

(b) Preparation of 3-(p-Amino-Benzene-Sulphonamido)-4-Benzylamino-Anisole 15.3 g. 3 - (p - acetamino-benzene-sulphonamido)-4-benzylamino-anisole is added to 150 cc. 10% hydrochloric acid mixed with 90 cc. of alcohol, and the mixture is refluxed until all the solid dissolves (about ½ hour). It is then filtered hot, and the cooled filtrate is made alkaline to litmus with strong sodium hydroxide. The product, 3 - (p - amino-benzene-sulphonamido)-4-benzylamino-anisole, separates out as a red gummy material, and is washed with water and crystallized from aqueous alcohol, and is then a pale-pink crystalline material.

Manifestly, a large number and variety of other (amino - benzene - sulphonamido) - aminophenol ethers (A) and other compounds (B) and (C) may be obtained by the procedure of the foregoing examples, using the appropriate reactants. The following additional compounds, inter alia, are thus obtainable:

2 - acetamino - 5 - (p - nitro - benzene - sulphonamido)-anisole

2 - acetamino - 5 - (p - amino -benzene - sulphonamido)-anisole 2-acetamino - 5 - (p-acetamino-benzene-sulphonamido)-anisole 2-amino-5-(p-amino - benzene - sulphonamido)-anisole 3-(2-nitro - 4 - methoxy - phenyl carbamido)-4-(p-acetamino-benzene-sulphonamido)- anisole [from 3-amino-4-(p-acetamino-benzene-sulphonamido)-anisole and 2–nitro-4-methoxyphenyl isocyanate]

3 - (2 - nitro-4-methoxy-phenylcarbamido)-4-(p-amino-benzene-sulphonamido)-anisole 3-(2-amino-4-methoxy - phenylcarbamido)-4(p-amino-benzene-sulphonamido)-anisole 3-(p-amino - benzene - sulphonamido)-5-aminoanisole 3-acetamino - 5 - (p-acetamino-benzene-sulphonamido)-anisole 3-amino-5-(p-amino - benzene - sulphonamido)-anisole 3-(p-amino - benzene-sulphonamido)- 4 - (p-anisoyl-amino)-anisole [from 3-nitro-4-aminoanisole and p-anisoyl chloride]

3-(p-amino-benzene-sulphonamido)-4-(p-nitrobenzoyl - amino) - anisole [from 3 - nitro-4-amino-anisole and p-nitro-benzoyl chloride]

3 - (p - amino - benzene - sulphonamido) - 4 - (p-amino-benzoyl-amino)-anisole 3-diethylamino - 4 - (p - amino-benzene-sulphonamido)-phenetole [from 3-diethylamino-4-amino-phenetole, obtainable by reacting 3-diethylamino-phenetole with phenyl-diazonium chloride, and reducing the resulting azo compound with SnCl₂ and HCl]

2 - (β - diethylamino-ethylamino) - 4 - (p - aminobenzene-sulphonamido)-anisole

2 - (β - diethylamino-ethylamino) - 5 - (p - aminobenzene-sulphonamido)-anisole

3 - (p - amino - benzene-sulphonamido)-4-(β-hydroxy-β'-chloro-iso-propylamino)-anisole 3 - (p-amino - benzene-sulphonamido)-4-(β-hydroxy - β' - diethylamino-isopropylamino)-anisole [by replacing the chloro radical in the immediately preceding compound with a diethylamino radical in the conventional manner]

3 - (p-amino-benzene-sulphonamido) - 4-[N-(5-diethylamino-pentyl-2)]-amino-anisole 3 - (p - amino - benzene-sulphonamido) - 4 - allyl-amino-anisole [from 3-nitro-4-allylamino-anisole, obtainable by reacting 3-nitro-4-amino-anisole with allyl bromide]

3 - (p-amino-benzene-sulphonamido) - 4 - propyl-amino-anisole [from 3-amino-4-propylamino-anisole, obtainable by catalytic hydrogenation of 3-nitro-4-allylamino-anisole]

3 - amino - 4 - [N - (p - acetamino - benzene - sulphonyl) - N'-(β-diethyl-amino-ethyl)]-amino-anisole [by dissolving 3-amino-4-(p-acetamino-benzene-sulphonamido)-anisole in a slight excess of aqueous alkali and boiling with β-diethylamino-ethyl chloride]

A derivative of 3-amino-4-(p-amino-benzene-sulphonamido)-anisole in which both R and R⁴ are methane sodium sulphinate radicals A derivative of 3-amino-4-(p-amino-benzene-sulphonamido)-anisole in which R is a methane sodium sulphinate radical A derivative of 3-amino-4-(p-amino-benzene-sulphonamido)-anisole in which R⁴ is a methane sodium sulphinate radical A derivative of 3-amino-4-(p-amino-benzene-sulphonamido)-anisole in which both R and R⁴ are α-ethane sodium sulphonate radicals A derivative of 3-amino-4-(p-amino-benzene-sulphonamido)-anisole in which R is an α-ethane sodium sulphonate radical A derivative of 3-amino-4-(p-amino-benzene-sulphonamido)-anisole in which R⁴ is an α-ethane sodium sulphonate radical Manifestly, also, compounds wherein the amino group

and the sulphonyl group are meta or ortho to each other may be obtained by the procedure of the foregoing examples, using the appropriate meta or ortho nitro-benzene-sulphonyl halide, alkyl-amino-benzene-sulphonyl halide, or acylamino-benzene-sulphonyl halide; and compounds wherein either or both of the benzene rings contain further substituents—which compounds it should be noted, are comprised by the genus (amino-benzene-sulphonamido)-aminophenol ethers—may be obtained by using the correspondingly-substituted nitro-amino-phenol ether, alkyl-amino-amino-phenol ether, or acylamino-amino-phenol ether and/or the correspondingly-substituted nitro-benzene-sulphonyl halide, alkyl-amino-benzene-sulphonyl halide, or acylamino-benzene-sulphonyl halide in the procedure of the foregoing examples.

Among other reactants utilizable in the procedure of the foregoing examples for the preparation of the compounds of this invention are:

p-Methylamino-benzene-sulphonyl chloride
p-Diethylamino-benzene-sulphonyl chloride
N²-methyl-3-methoxy-o-phenylene-diamine
3-methoxy-N'-phenyl-p-phenylene-diamine
4-ethoxy-m-phenylene-diamine
4-cyclohexyloxy-m-phenylene-diamine
4-phenoxy-o-phenylene-diamine
2-ethoxy-p-phenylene-diamine
2-butoxy-N⁴-phenyl-p-phenylene-diamine
4-methyl-6-nitro-m-anisidine
6-methyl-2-nitro-m-anisidine
6-methyl-5-nitro-m-anisidine
5-methyl-6-nitro-o-anisidine
5-methoxy-m-phenylene-diamine
3-methoxy-o-phenylene-diamine
2-methoxy-p-phenylene-diamine
3-nitro-4-diethylamino-anisole (from 3-nitro-4-iodo-anisole and diethylamine)

It is further obvious that (amino-benzene-sulphonamido)-aminophenol ethers which contain one or more free amino groups may be converted into a variety of acyl derivatives other than those disclosed hereinbefore, inter alia, glycolic, thioglycolic, and malic acid derivatives. Thus, for example, 3-glycolyamino-4-(p-acetamino-benzene-sulphonamido)-anisole may be obtained by fusing 3-amino-4-(p-acetamino-benzene-sulphonamido)-anisole with an equivalent quantity of glycolic acid.

The invention is not to be construed as in any sense restricted to the foregoing specific examples, compounds, reactants, procedures or steps, but may be variously otherwise embodied within the scope of the appended claims.

We claim:

1. A compound of the general formula

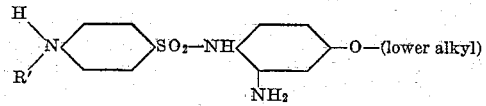

wherein R' represents a member of the group consisting of hydrogen, hydrocarbon, dialkyl-amino-substituted-hydrocarbon, and acyl radicals.

2. A compound of the general formula

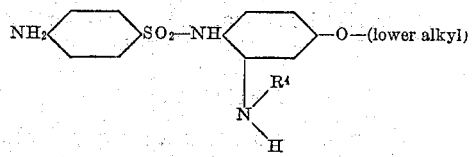

wherein R⁴ represents a member of the group consisting of hydrogen, hydrocarbon, dialkyl-amino-substituted-hydrocarbon, and acyl radicals.

3. 3-amino-4-(p-amino-benzene - sulphonamido)-anisole.

4. 3-amino-4-(p-amino-benzene - sulphonamido)-phenetole.

5. 3-phenylcarbamido-4-(p - amino - benzene-sulphonamido)-anisole.

WILLIAM A. LOTT.
FRANK H. BERGEIM.
KATHRYN A. LOSEE.